US012585706B2

(12) United States Patent
Panigrahi et al.

(10) Patent No.: US 12,585,706 B2
(45) Date of Patent: Mar. 24, 2026

(54) MACHINE-LEARNING BASED (ML-BASED) SYSTEM AND METHOD FOR AUTOMATICALLY PROCESSING ONE OR MORE DOCUMENTS

(71) Applicant: HIGHRADIUS TECHNOLOGIES PRIVATE LIMITED, Hyderabad (IN)

(72) Inventors: Parsuram Panigrahi, Hyderabad (IN); Somesh Manna, Hyderabad (IN); Chirodeep Kar, Hyderabad (IN); Susanta Kumar Sahoo, Hyderabad (IN); Nilesh Kumar, Hyderabad (IN); Atanu Mazumdar, Hyderabad (IN)

(73) Assignee: HIGHRADIUS TECHNOLOGIES PRIVATE LIMITED (IN)

( * ) Notice: Subject to any disclaimer, the term of this patent is extended or adjusted under 35 U.S.C. 154(b) by 0 days.

(21) Appl. No.: 19/004,510

(22) Filed: Dec. 30, 2024

(65) Prior Publication Data

US 2025/0258868 A1     Aug. 14, 2025

(30) Foreign Application Priority Data

Feb. 12, 2024     (IN) .............................. 202441009314

(51) Int. Cl.
G06F 16/906     (2019.01)
G06F 16/93     (2019.01)
G06N 20/00     (2019.01)

(52) U.S. Cl.
CPC ............ *G06F 16/906* (2019.01); *G06F 16/93* (2019.01); *G06N 20/00* (2019.01)

(58) Field of Classification Search
CPC ........ G06F 16/906; G06F 16/93; G06N 20/00
See application file for complete search history.

(56) References Cited

U.S. PATENT DOCUMENTS

2025/0117833 A1 *     4/2025     Sahu ..................... G06F 40/174

* cited by examiner

*Primary Examiner* — Hau H Hoang
(74) *Attorney, Agent, or Firm* — Jason C. Cameron

(57) ABSTRACT

A machine-learning based (ML-based) system and method for automatically processing one or more documents are disclosed. Initially, data associated with at least one of: first contents and second contents are obtained from data sources. The data are pre-processed to generate pre-processed data. The first contents are classified are classified as at least one of: claim-based contents and non-claim-based contents, using a machine learning (ML) model with prompts. Additionally, the second contents are classified as at least one of: the claim-based contents and the non-claim-based contents, based on intents of the second contents, using the ML model with the prompts. At least one of: the claim-based contents and the non-claim-based contents, are provided as an output, to users on user interfaces associated with electronic devices associated with the users.

18 Claims, 8 Drawing Sheets

104

100

104

Memory unit 202

Plurality of subsystems 110

Data obtaining subsystem 210

Data pre-processing subsystem 212

Content classifying subsystem 214

Entity identifying subsystem 216

Output subsystem 218

Training subsystem 220

Accuracy assessment subsystem 222

Re-training subsystem 224

System bus 208

Storage unit 206

Hardware processor(s) 204

214

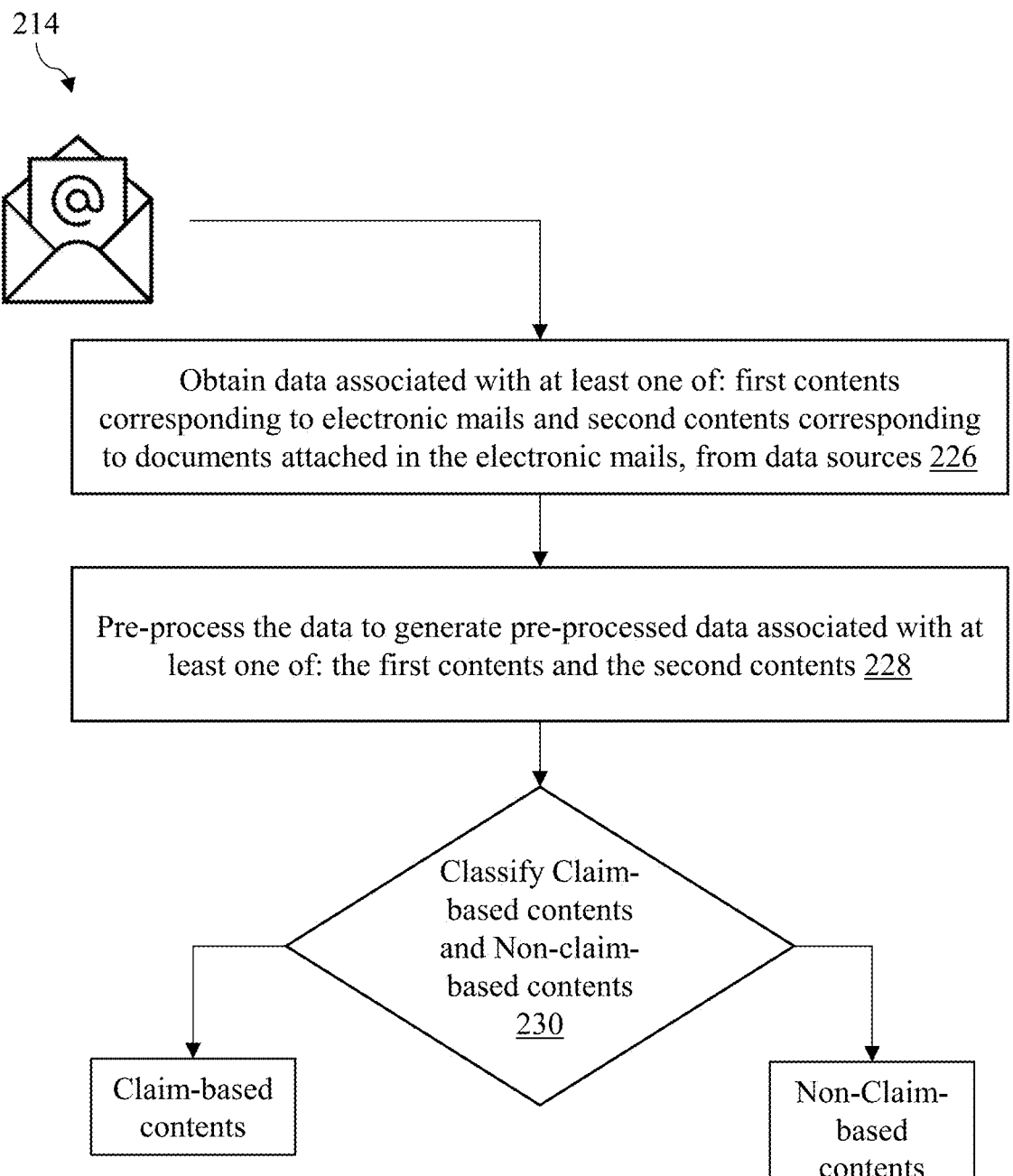

Obtain data associated with at least one of: first contents corresponding to electronic mails and second contents corresponding to documents attached in the electronic mails, from data sources 226

Pre-process the data to generate pre-processed data associated with at least one of: the first contents and the second contents 228

Classify Claim-based contents and Non-claim-based contents 230

Claim-based contents

Non-Claim-based contents

FIG. 2B

232

Obtain one or more text chunks, related to at least one of: the one or more first contents and the one or more second contents 234

Select prompts from a database by comparing the text chunks with training datasets stored in the database using a similarity matching technique 236

Determine the claim-based contents and the non-claim-based contents from the at least one of: the first contents and the second contents, based on the prompts selected from the database, using the ML model 238

Classify at least one of: the first contents and the second contents as at least one of: the claim-based contents and the non-claim-based contents 240

Map the electronic mail domains of the entities with pre-determined information associated with the electronic mail domains of the entities stored in one or more data sources, to identify the entities 242

Extract entities from at least one of: headers, logos, and signatures, related to the entities in at least one of: the first contents and the second contents 244

Identify entities corresponding to at least one of: first contents and second contents, for extracting information associated with the claim based-contents 246

OBTAIN DATA ASSOCIATED WITH AT LEAST ONE OF: FIRST CONTENTS CORRESPONDING TO ELECTRONIC MAILS AND SECOND CONTENTS CORRESPONDING TO DOCUMENTS ATTACHED IN THE ELECTRONIC MAILS, FROM DATA SOURCES 402

PRE-PROCESS THE DATA TO GENERATE PRE-PROCESSED DATA ASSOCIATED WITH AT LEAST ONE OF: THE FIRST CONTENTS AND THE SECOND CONTENTS 404

CLASSIFY AT LEAST ONE OF: (A) THE FIRST CONTENTS AS AT LEAST ONE OF: CLAIM-BASED CONTENTS AND NON-CLAIM-BASED CONTENTS, USING A MACHINE LEARNING (ML) MODEL WITH PROMPTS, AND (B) THE SECOND CONTENTS, AS AT LEAST ONE OF: THE CLAIM-BASED CONTENTS AND THE NON-CLAIM-BASED CONTENTS, BASED ON INTENTS OF THE SECOND CONTENTS, USING THE ML MODEL WITH THE PROMPTS 406

PROVIDE AT LEAST ONE OF: THE CLAIM BASED CONTENTS AND THE NON-CLAIM BASED CONTENTS, AS AN OUTPUT, TO USERS ON USER INTERFACES ASSOCIATED WITH ELECTRONIC DEVICES ASSOCIATED WITH THE USERS 408

RE-TRAIN THE ML MODEL BY AT LEAST ONE OF: UPDATING THE PRE-PROCESSED DATA AND ADJUSTING HYPERPARAMETERS, BASED ON FEEDBACK RECEIVED FROM THE USERS ON THE CLASSIFICATION 410

FIG. 4

MACHINE-LEARNING BASED (ML-BASED) SYSTEM AND METHOD FOR AUTOMATICALLY PROCESSING ONE OR MORE DOCUMENTS

EARLIEST PRIORITY DATE

This Application claims priority from a Provisional patent application filed in India having Patent Application No. 202441009314, filed on Feb. 12, 2024, and titled "MACHINE LEARNING BASED SYSTEMS AND METHODS FOR PROCESSING CLAIM DOCUMENTS".

FIELD OF INVENTION

Embodiments of the present disclosure relate to machine learning-based (ML-based) computing systems and more particularly relate to a machine-learning based (ML-based) system and a method for automatically processing one or more documents.

BACKGROUND

In business-to-business (B2B) transactions, a claim document processing is a critical yet highly complex task for seller businesses. The claim document is a document issued by buyers to justify deductions in payments, detailing reasons such as refunds, chargebacks, or short payments. The claim document is typically communicated via electronic mails in various formats like one of: portable document formats (PDFs), Word files, Excel sheets, and images. However, a lack of standardization in the claim document formats across businesses creates significant challenges for automation. Buyer businesses often use unique templates with varying terminologies and layouts, making the claim document difficult to consistently extract necessary fields like claim numbers, amounts, tax details, and reasons for deductions.

Existing systems rely on one of: rule-based and template-specific bots to automate the claim document processing. However, these approaches are fraught with multiple limitations. Each bot may be customized for a specific buyer's claim document format, which is both costly and time-intensive. For businesses dealing with hundreds of the buyers, this requires maintaining a large number of bots and folder structures, which quickly becomes unmanageable. Moreover, any change in the claim document structure or email identifiers requires frequent modifications to the bots and the folder structures, further escalating costs and operational complexity.

Manual processing of the claim document, on the other hand, is labor-intensive, costly, prone to errors, and results in delays that may damage buyer relationships. Non-claim emails, promotional emails, or irrelevant attachments often clutter general-purpose mailboxes, further complicating claim identification. Even when automation is used, rule-based systems struggle to manage a diversity in the claim document formats, file extensions, and attachment content, as there are no universal patterns or standards in the industry.

Additionally, traditional Optical Character Recognition (OCR) tools often fail to achieve the required accuracy for extracting data from complex or handwritten claim documents. This leads to significant manual intervention, undermining the efficiency gains of automation. While the traditional approaches provide some level of automation, they are limited by their dependence on predefined templates and rigid rules, which makes the traditional approaches inefficient and costly to maintain. For example, any variation in document structure, terminology, or layout requires significant reconfiguration or retraining, leading to high operational costs and time delays.

There are various technical problems with the claim document processing in the prior art. In the existing technologies lack adaptability to evolving formats and fail to address the end-to-end nature of the claim document processing, which includes classifying emails, identifying relevant attachments, extracting critical fields, and mapping them to corresponding customer accounts. As a result, businesses often face high labor costs, processing delays, and risks of data errors, impacting overall productivity and customer satisfaction.

Therefore, there is a need for a machine-learning based (ML-based) system for automatically processing the claim document, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a machine-learning based (ML-based) method for automatically processing one or more documents, is disclosed. The ML-based method comprises obtaining, by one or more hardware processors, data associated with at least one of: one or more first contents corresponding to one or more electronic mails and one or more second contents corresponding to the one or more documents attached in the one or more electronic mails, from one or more data sources.

The ML-based method further comprises pre-processing, by the one or more hardware processors, the data to generate pre-processed data associated with at least one of: the one or more first contents and the one or more second contents.

The ML-based method further comprises classifying, by the one or more hardware processors, at least one of: a) the one or more first contents as at least one of: one or more claim-based contents and one or more non-claim-based contents, using a machine learning (ML) model with one or more prompts, and b) the one or more second contents, as at least one of: the one or more claim-based contents and the one or more non-claim-based contents, based on one or more intents of the one or more second contents, using the ML model with the one or more prompts.

The ML-based method further comprises providing, by the one or more hardware processors, at least one of: the one or more claim-based contents and the one or more non-claim-based contents, as an output, to one or more users on one or more user interfaces associated with one or more electronic devices associated with the one or more users.

In an embodiment, the pre-processing the data comprises: a) extracting, by the one or more hardware processors, one or more texts having one or more formats from at least one of: one or more first contents and the one or more second contents, using a document scraper model, b) vectorizing, by the one or more hardware processors, the extracted one or more texts to extract one or more text chunks from the extracted one or more texts.

In yet another embodiment, the ML-based method classifying at least one of: the one or more first contents and the one or more second contents as at least one of: the one or more claim-based contents and the one or more non-claim based contents, comprises a) obtaining, by the one or more hardware processors, the one or more text chunks, related to at least one of: the one or more first contents and the one or more second contents; b) selecting, by the one or more hardware processors, the one or more prompts from a database by comparing the one or more text chunks with one or more training datasets stored in the database, using a similarity matching technique, c) determining, by the one or more hardware processors, at least one of: the one or more claim-based contents and the one or more non-claim-based contents from the at least one of: the one or more first contents and the one or more second contents, based on the one or more prompts selected from the database, using the ML model, and d) classifying, by the one or more hardware processors, at least one of: the one or more first contents and the one or more second contents as at least one of: the one or more claim-based contents and the one or more non-claim-based contents.

In yet another embodiment, the ML-based method further comprises identifying, by the one or more hardware processors, one or more entities corresponding to at least one of: the one or more first contents and the one or more second contents, for extracting the one or more claim-based contents, by at least one of: a) mapping, by the one or more hardware processors, one or more electronic mail domains of the one or more electronic mails with one or more pre-determined information associated with the one or more electronic mail domains of the one or more entities stored in the one or more data sources, to identify the one or more entities, and b) extracting, by the one or more hardware processors, the one or more entities from at least one of: one or more headers, one or more logos, and one or more signatures, in at least one of: the one or more first contents and the one or more second contents.

In yet another embodiment, the ML-based method further comprises training, by the one or more hardware processors, the ML model, by: a) obtaining, by the one or more hardware processors, one or more training datasets comprising information associated with at least one of: the one or more first contents corresponding to the one or more electronic mails and the one or more second contents corresponding to the one or more documents attached in the one or more electronic mails, b) training, by the one or more hardware processors, the ML model on the one or more training datasets using one or more hyperparameters, c) classifying, by the one or more hardware processors, at least one of: the one or more first contents and the one or more second contents, as at least one of: the one or more claim-based contents and the one or more non-claim-based contents, based on the trained ML model.

In yet another embodiment, the ML-based method further comprises re-training, by the one or more hardware processors, the ML model by: a) obtaining, by the one or more hardware processors, one or more assessments of the one of more training datasets, from the one or more users, b) identifying, by the one or more hardware processors, differences between the ML model classification and the one or more assessments obtained from the one or more users, to determine whether the ML model need to be optimized on the classification, and c) re-training, by the one or more hardware processors, the ML model by at least one of: updating the pre-processed data and adjusting the one or more hyperparameters, based on one or more feedback received from the one or more users on the classification.

In yet another embodiment, the ML-based method further comprises: a) monitoring, by the one or more hardware processors, performance of the ML model for a time duration, b) determining, by the one or more hardware processors, whether the performance of the ML model on the classification of at least one of: the one or more first contents and the one or more second contents, is below a threshold value, and c) fine-tuning, by the one or more hardware processors, the ML model with a plurality of parameters to optimize the ML model for classifying at least one of: the one or more first contents and the one or more second contents, as at least one of: the one or more claim-based contents and the one or more non-claim-based contents.

In one aspect, a machine learning based (ML-based) system for automatically processing one or more documents, is disclosed. The ML-based system includes the one or more hardware processors, and a memory coupled to the one or more hardware processors. The memory includes a plurality of subsystems in the form of programmable instructions executable by the one or more hardware processors.

The plurality of subsystems comprises a data obtaining subsystem is configured to obtain the data associated with at least one of: the one or more first contents corresponding to the one or more electronic mails and the one or more second contents corresponding to the one or more documents attached in the one or more electronic mails, from the one or more data sources.

The plurality of subsystems comprises a data pre-processing subsystem configured to pre-process the data to generate the pre-processed data associated with at least one of: the one or more first contents and the one or more second contents.

The plurality of subsystems comprises a content classifying subsystem configured to classify at least one of: a) the one or more first contents as at least one of: the one or more claim-based contents and the one or more non-claim-based contents, using the ML model with the one or more prompts, and b) the one or more second contents, as at least one of: the one or more claim-based contents and the one or more non-claim-based contents, based on one or more intents of the one or more second contents, using the ML model with the one or more prompts.

The plurality of subsystems comprises an output subsystem configured to provide at least one of: the one or more claim-based contents and the one or more non-claim-based contents, as an output, to the one or more users on the one or more user interfaces associated with the one or more electronic devices associated with the one or more users.

In another aspect, a non-transitory computer-readable storage medium having instructions stored therein that, when executed by a hardware processor, causes the processor to perform method steps as described above.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which:

FIG. 2B is a detailed view of a content classifying subsystem, in accordance with an embodiment of the present disclosure;

FIG. 2C is a flow chart illustrating processes performed by the content classifying subsystem, in accordance with an embodiment of the present disclosure;

FIG. 2D is a detailed view of an entity identifying subsystem, in accordance with an embodiment of the present disclosure;

FIG. 4 is a flow chart illustrating a ML-based method for automatically processing the one or more documents, in accordance with an embodiment of the present disclosure.

Figure 1:
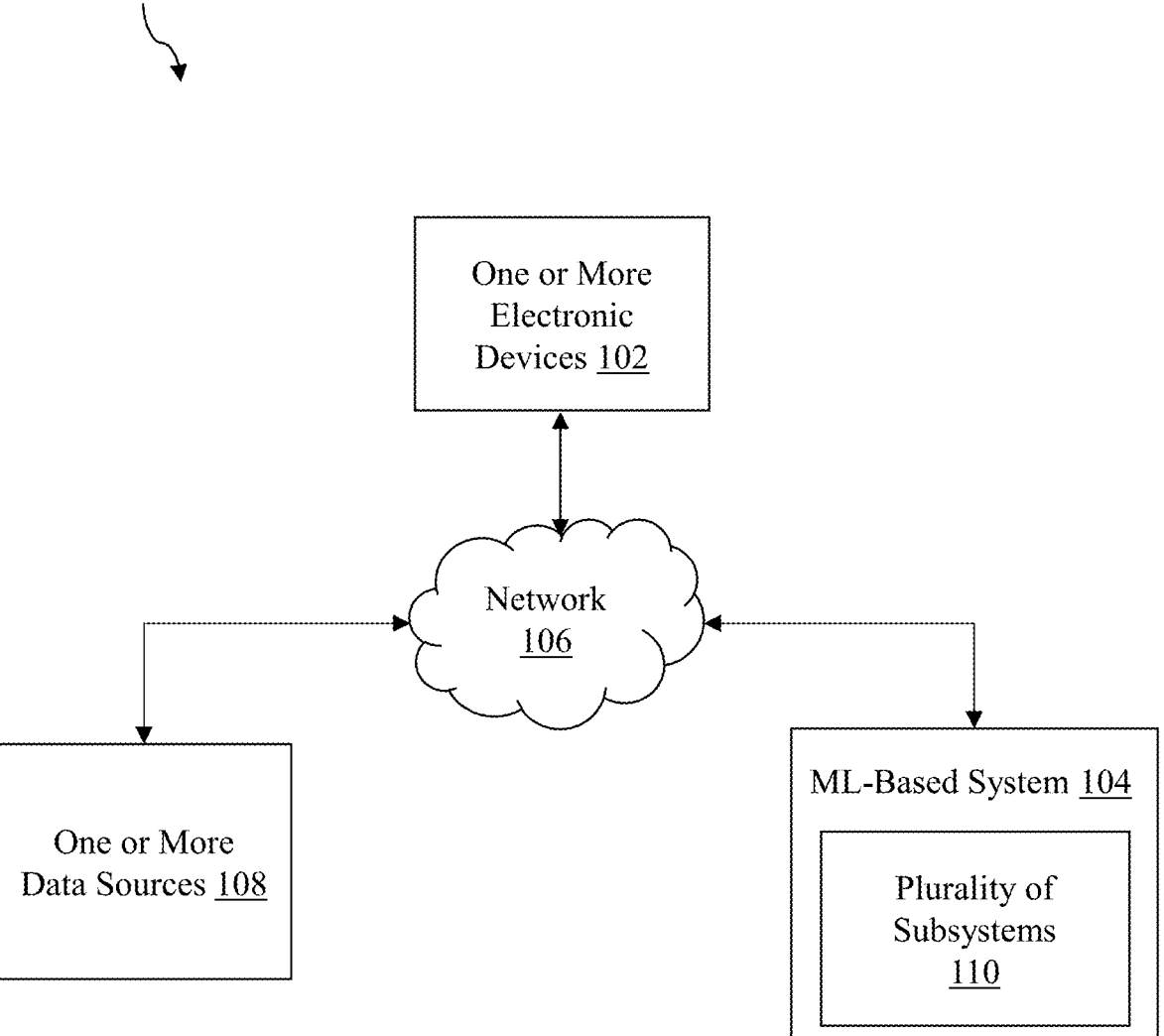
FIG. 1 is a block diagram illustrating a computing environment with a machine learning based (ML-based) system for automatically processing one or more documents, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIG. 1 through FIG. 4, where similar reference characters denote corresponding features consistently throughout the figures, there are shown preferred embodiments, and these embodiments are described in the context of the following exemplary system and/or method.

FIG. 1 is a block diagram illustrating a computing environment 100 with a machine learning based (ML-based) system 104 for automatically processing one or more documents, in accordance with an embodiment of the present disclosure.

According to an exemplary embodiment of the present disclosure, the computing environment 100 may include one or more electronic devices 102, the ML-based system 104, and one or more data sources 108. According to FIG. 1, the computing environment 100 includes the one or more electronic devices 102 that are communicatively coupled to the ML-based system 104 through a network 106. The one or more electronic devices 102 through which one or more users receive output results from the ML-based system 104. In another embodiment, the one or more documents comprises at least one of: claim-related documents, such as invoices, credit notes, chargeback notices, or deduction statements, received as attachments in one or more formats, including but not limited to portable document formats (PDFs), Word files, Excel files, image files, and the like. In another embodiment, the one or more documents are transmitted through one or more electronic mails or retrieved from shared storage platforms and serve as the primary input for the ML-based system 104. The ML-based system 104 is configured to classify these one or more documents, extract key claim-related information, and provide the output s including at least one of: claim costs, tax amounts, claim dates, and reason codes, directly to the one or more electronic devices 102. The extracted results may then be utilized for downstream applications, including at least one of: deduction validation and financial reconciliation, ensuring seamless integration with existing workflows and improved operational efficiency.

The present invention is configured to automatically process the one or more documents. The ML-based system 104 is initially configured to obtain data associated with at least one of: one or more first contents corresponding to one or more electronic mails and one or more second contents corresponding to the one or more documents attached in the one or more electronic mails, from the one or more data sources 108. In an embodiment, the data may be encrypted and decrypted by the ML-based system 104, so that one or more third party users cannot be authenticated to manipulate the data.

The ML-based system 104 is further configured to pre-process the data to generate pre-processed data associated with at least one of: the one or more first contents and the one or more second contents. The ML-based system 104 is further configured to classify the one or more first contents as at least one of: one or more claim-based contents and one or more non-claim-based contents, using a machine learning (ML) model with one or more prompts. The ML-based system 104 is further configured to classify the one or more second contents, as at least one of: the one or more claim-based contents and the one or more non-claim-based contents, based on one or more intents of the one or more second contents, using the ML model with the one or more prompts. The ML-based system 104 is further configured to provide at least one of: the one or more claim-based contents and the one or more non-claim-based contents, as an output, to one or more users on one or more user interfaces associated with the one or more electronic devices 102 associated with the one or more users.

In an exemplary embodiment, the ML-based system 104 may be deployed via one or more servers. The one or more servers comprise one or more hardware processors and a memory unit that includes a set of computer-readable instructions executable by the one or more hardware processors to automatically process the one or more documents.

The one or more hardware processors may comprise a combination of discrete components, an integrated circuit, an application-specific integrated circuit, a field-program-mable gate array, a digital signal processor, or other suitable one or more hardware processors and a software. The "software" may comprise one or more objects, agents, threads, lines of code, subroutines, separate software appli-cations, two or more lines of code, or other suitable software structures operating in one or more software applications or the one or more hardware processors. The memory unit is operatively connected to the one or more hardware proces-sors. The memory unit comprises the set of computer-readable instructions in form of a plurality of subsystems 110, configured to be executed by the one or more hardware processors.

In an exemplary embodiment, the one or more hardware processors may include, for example, microprocessors, microcomputers, microcontrollers, digital signal processors, central processing units, state machines, logic circuits, and/ or any devices that manipulate data or signals based on operational instructions. Among other capabilities, the one or more hardware processors may fetch and execute com-puter-readable instructions in the memory unit operationally coupled with the ML-based system 104 for automatically processing the one or more documents. The one or more hardware processors is high-performance processors capable of handling large volumes of data and complex computations. The one or more hardware processors may be, but not limited to, at least one of: multi-core central pro-cessing units (CPU), graphics processing units (GPUs), and specialized Artificial Intelligence (AI) accelerators that enhance an ability of the ML-based system 104 to process real-time data from a plurality of sources simultaneously.

In an exemplary embodiment, the one or more data sources 108 may configured to store, and manage data related to various aspects of the ML-based system 104. The one or more data sources 108 may store at least one of, but not limited to, historical data, training datasets used for a machine learning (ML) model, labelled datasets for super-vised learning, extracted metadata from the one or more documents and the one or more electronic mails, validation datasets for accuracy assessment, prompts and templates used for claim-specific information extraction, vectorized representations of text chunks for similarity searches, and feedback data provided by users for the ML-based system re-training and optimization. Additionally, the one or more data sources 108 may include repositories for storing extracted claim details, such as claim numbers, claim costs, tax amounts, net amounts, reason codes, and associated customer information, ensuring that these outputs are readily available for downstream systems such as enterprise resource planning (ERP) platforms or financial reconcilia-tion tools. The one or more data sources 108 may also facilitate the storage of domain-specific models, updates to ML hyperparameters, and logs of system performance met-rics, enabling continuous improvement and adaptability of the ML-based system 104 to diverse claim document for-mats and evolving business needs. The one or more data sources 108 may include different types of databases such as, but not limited to, relational databases (e.g., Structured Query Language (SQL) databases), non-Structured Query Language (NoSQL) databases (e.g., MongoDB, Cassandra), time-series databases (e.g., InfluxDB), an OpenSearch data-base, object storage systems (e.g., Amazon S3, PostgresDB), and the like. Furthermore, the one or more data sources 108 may facilitate integration with external systems through APIs, allowing the ingestion of new data types such as one or more pre-determined information associated with the one or more electronic mail domains of the one or more entities, payment vouchers, financial statements, and remittance documents from third-party databases. The one or more data sources 108 play a critical role in ensuring the adaptability and scalability of the ML-based system 104 by providing comprehensive data support for both initial ML model training and ongoing ML-based system 104 updates.

In an exemplary embodiment, the one or more electronic devices 102 are configured to enable the one or more users to interact with the ML-based system 104. The one or more electronic devices 102 may be digital devices, computing devices, and/or networks. The one or more electronic devices 102 may include, but not limited to, a mobile device, a smartphone, a personal digital assistant (PDA), a tablet computer, a phablet computer, a wearable computing device, a virtual reality/augmented reality (VR/AR) device, a laptop, a desktop, and the like. The one or more electronic devices 102 are configured with a user interface configured to enable seamless interaction between the one or more users and the ML-based system 104. The user interface may include the graphical user interfaces (GUIs), voice-based interfaces, and touch-based interfaces, depending on the capabilities of the one or more electronic devices 102 being used. The GUIs may be configured to display outputs, including at least one of: one or more claim-based contents, one or more non-claim-based contents, extracted claim details such as claim numbers, claim costs, net amounts, tax amounts, and reason codes, metadata about the processed one or more documents (e.g., sender information, timestamps, attachment details), real-time claim status updates, and system performance metrics such as accuracy scores and processing times. The user interface may also provide interactive dashboards to allow the one or more users to validate the one or more claim-based contents and the one or more entities, submit feedback for retraining the ML model, view processed claims in structured formats like tables or charts, and download reports or export data to downstream systems. Furthermore, the user interface may include notification mechanisms to alert the one or more users about latest one or more claim-based contents, processing errors, and performance thresholds requiring attention, ensuring efficient management and decision-making.

In an embodiment, the one or more users may include at least one of: financial analysts, cash analysts, deductions analysts, accounts receivable professionals, business analysts, collection analysts, treasury managers, customer relationship managers, accountants, auditors, debt collectors, and other professionals involved in order-to-cash processes, collections management, financial reconciliation workflows, and the like. The one or more users may also include Information Technology (IT) administrators responsible for managing the ML-based system 104, as well as decision-makers or executives who require access to claim insights and analytics for strategic decision-making. Additionally, the one or more users may include external stakeholders, such as, but not limited to, at least one of: consultants and auditors, who interact with the ML-based system 104 to review claim processing performance, validate deductions, and ensure compliance with regulatory and business requirements.

In an exemplary embodiment, the one or more electronic devices 102 may be associated with, but not limited to, business organizations, financial institutions, manufacturing companies, retail chains, logistics providers, consumer goods companies, and other entities engaged in business-to-business (B2B) transactions. The one or more electronic devices 102 may also be associated with at least one of: shared service centers, outsourcing firms, and technology providers responsible for managing claims, deductions, and financial reconciliations on behalf of their clients. Furthermore, the one or more electronic devices 102 may be linked to specific departments such as, but not limited to, at least one of: accounts receivable, treasury management, order-to-cash operations, and compliance teams within the organization, enabling seamless access to claim processing workflows and extracted data for various business needs.

In an exemplary embodiment, the networks 106 may be, but not limited to, a wired communication network and/or a wireless communication network, a local area network (LAN), a wide area network (WAN), a Wireless Local Area Network (WLAN), a metropolitan area network (MAN), a telephone network, such as the Public Switched Telephone Network (PSTN) or a cellular network, an intranet, the Internet, a fibre optic network, a satellite network, a cloud computing network, or a combination of networks. The wired communication network may comprise, but not limited to, at least one of: Ethernet connections, Fiber Optics, Power Line Communications (PLCs), Serial Communications, Coaxial Cables, Quantum Communication, Advanced Fiber Optics, Hybrid Networks, and the like. The wireless communication network may comprise, but not limited to, at least one of: wireless fidelity (wi-fi), cellular networks (including fourth generation (4G) technologies and fifth generation (5G) technologies), Bluetooth, ZigBee, long-range wide area network (LoRaWAN), satellite communication, radio frequency identification (RFID), 6G (sixth generation) networks, advanced IoT protocols, mesh networks, non-terrestrial networks (NTNs), near field communication (NFC), and the like.

In an exemplary embodiment, the ML-based system 104 may be implemented by way of a single device or a combination of multiple devices that may be operatively connected or networked together. The ML-based system 104 may be implemented in hardware or a suitable combination of hardware and software.

Though few components and the plurality of subsystems 110 are disclosed in FIG. 1, there may be additional components and subsystems which is not shown, such as, but not limited to, ports, routers, repeaters, firewall devices, network devices, the one or more data sources 108, network attached storage devices, assets, machinery, instruments, facility equipment, emergency management devices, image capturing devices, any other devices, and combination thereof. The person skilled in the art should not be limiting the components/subsystems shown in FIG. 1. Although FIG. 1 illustrates the ML-based system 104, and the one or more one or more electronic devices 102 connected to the one or more data sources 108, one skilled in the art can envision that the ML-based system 104, and the one or more electronic devices 102 may be connected to several end user devices located at various locations and several databases via the network 106.

Those of ordinary skilled in the art will appreciate that the hardware depicted in FIG. 1 may vary for particular implementations. For example, other peripheral devices such as an optical disk drive and the like, the local area network (LAN), the wide area network (WAN), wireless (e.g., wireless-fidelity (Wi-Fi)) adapter, graphics adapter, disk controller, input/output (I/O) adapter also may be used in addition or place of the hardware depicted. The depicted example is provided for explanation only and is not meant to imply architectural limitations concerning the present disclosure.

Those skilled in the art will recognize that, for simplicity and clarity, the full structure and operation of all data processing systems suitable for use with the present disclosure are not being depicted or described herein. Instead, only so much of the ML-based system 104 as is unique to the present disclosure or necessary for an understanding of the present disclosure is depicted and described. The remainder of the construction and operation of the ML-based system 104 may conform to any of the various current implementations and practices that were known in the art.

Figure 2A:
FIG. 2A is a detailed view of the ML-based system for automatically processing the one or more documents, in accordance with an embodiment of the present disclosure.

FIG. 2A is a detailed view of the ML-based system 104 for automatically processing the one or more documents, in accordance with an embodiment of the present disclosure.

FIG. 2B is a detailed view of a content classifying subsystem 214, in accordance with an embodiment of the present disclosure.

FIG. 2C is a flow chart 232 illustrating processes performed by the content classifying subsystem 214, in accordance with an embodiment of the present disclosure.

FIG. 2D is a detailed view of an entity identifying subsystem 216, in accordance with an embodiment of the present disclosure.

The ML-based system 104 includes the memory unit 202, the one or more hardware processors 204, and a storage unit 206. The memory unit 202, the one or more hardware processors 204, and the storage unit 206 are communicatively coupled through a system bus 208 or any similar mechanism. The memory unit 202 includes the plurality of subsystems 110 in the form of programmable instructions executable by the one or more hardware processors 204. The system bus 208 facilitates the efficient exchange of information and instructions, enabling the coordinated operation of the ML-based system 104. The system bus 208 may be implemented using various technologies, including but not limited to, parallel buses, serial buses, or high-speed data transfer interfaces such as, but not limited to, at least one of a: universal serial bus (USB), peripheral component interconnect express (PCIe), and similar standards.

In an exemplary embodiment, the memory unit 202 is operatively connected to the one or more hardware processors 204. The memory unit 202 comprises the plurality of subsystems 110 in the form of programmable instructions executable by the one or more hardware processors 204. The plurality of subsystems 110 comprises a data obtaining subsystem 210, a data pre-processing subsystem 212, the content classifying subsystem 214, the entity identifying subsystem 216, an output subsystem 218, a training subsystem 220, an accuracy assessment subsystem 222, and a re-training subsystem 224. The brief details of the plurality of subsystems 110 have been elaborated in a below table.

hardware processors 204, such as being a computer-readable storage medium. The one or more hardware processors 204 may execute machine-readable instructions and/or source code stored in the memory unit 202. A variety of machine-readable instructions may be stored in and accessed from the memory unit 202. The memory unit 202 may include any suitable elements for storing data and machine-readable instructions, such as read-only memory, random access memory, erasable programmable read-only memory, electrically erasable programmable read-only memory, a hard drive, a removable media drive for handling compact disks, digital video disks, diskettes, magnetic tape cartridges, memory cards, and the like. In the present embodiment, the memory unit 202 includes the plurality of subsystems 110

| Plurality of Subsystems 110 | Functionality |
|---|---|
| Data obtaining subsystem 210 | The data obtaining subsystem 210 is configured to obtain data associated with at least one of: one or more first contents corresponding to the one or more electronic mails and one or more second contents corresponding to the one or more documents attached in the one or more electronic mails, from the one or more data sources. |
| Data pre-processing subsystem 212 | The data pre-processing subsystem 212 is configured to pre-process the data to generate pre-processed data associated with at least one of: the one or more first contents and the one or more second contents. |
| Content classifying subsystem 214 | The content classifying subsystem 214 is configured to classify at least one of: the one or more first contents as at least one of: one or more claim-based contents and one or more non-claim-based contents, using a machine learning (ML) model with one or more prompts; and the one or more second contents, as at least one of: the one or more claim-based contents and the one or more non-claim-based contents, based on one or more intents of the one or more second contents, using the ML model with the one or more prompts. |
| Entity identifying subsystem 216 | The entity identifying subsystem 216 is configured to identify the one or more entities corresponding to at least one of: the one or more first contents and the one or more second contents, for extracting the one or more claim-based contents. |
| Output subsystem 218 | The output subsystem 218 is configured to provide at least one of: the one or more claim-based contents and the one or more non-claim-based contents, as the output, to the one or more users on the one or more user interfaces associated with the one or more electronic devices 102 associated with the one or more users. |
| Training subsystem 220 | The training subsystem 220 is configured to train the ML model for automatically processing the one or more documents. |
| Accuracy assessment subsystem 222 | The accuracy assessment subsystem 222 is configured to monitor performance of the ML model for a time duration and determine whether the performance of the ML model on the classification of at least one of: the one or more first contents and the one or more second contents, is below a threshold value. |
| Re-training subsystem 224 | The re-training subsystem 224 is configured to re-train the ML model by at least one of: updating the pre-processed data and adjusting one or more hyperparameters, based on one or more feedback received from the one or more users on the classification. |

The one or more hardware processors 204, as used herein, means any type of computational circuit, such as, but not limited to, the microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 204 may also include embedded controllers, such as generic or programmable logic devices or arrays, application-specific integrated circuits, single-chip computers, and the like.

The memory unit 202 may be the non-transitory volatile memory and the non-volatile memory. The memory unit 202 may be coupled to communicate with the one or more stored in the form of machine-readable instructions on any of the above-mentioned storage media and may be in communication with and executed by the one or more hardware processors 204.

The storage unit 206 may be a cloud storage or the one or more data sources 108 such as those shown in FIG. 1. The storage unit 206 may store, but not limited to, recommended course of action sequences dynamically generated by the ML-based system 104. These action sequences may comprise at least one of: pre-processing the one or more documents, classifying one or more claim-based contents and one or more non-claim-based contents, extracting the one or more claim-based contents, extracting the one or more entities, training and re-training of the ML model, and the like. The dynamically generated action sequences may be used to optimize the evaluation of the ML-based system 104, improve response accuracy, enhance accuracy of processing the one or more documents using the ML-based system 104. Additionally, the storage unit 206 may retain previous action sequences for comparison and future reference, enabling continuous refinement of the ML-based system 104 over time. The storage unit 206 may be any kind of database such as, but not limited to, relational databases, dedicated databases, dynamic databases, monetized databases, scalable databases, cloud databases, distributed databases, any other databases, and a combination thereof.

In an exemplary embodiment, the plurality of subsystems 110 includes the data obtaining subsystem 210 that is communicatively connected to the one or more hardware processors 204. The data obtaining subsystem 210 is configured to obtain data associated with at least one of: the one or more first contents corresponding to the one or more electronic mails and the one or more second contents corresponding to the one or more documents attached in the one or more electronic mails, from the one or more data sources 108. The data obtaining subsystem 210 operates as a foundational component of the ML-based system 104, enabling seamless integration with various input sources to retrieve both structured and unstructured data for processing.

In an exemplary embodiment, the one or more first contents corresponding to one or more electronic mails may include, but not limited to, the metadata associated with the one or more electronic mails and an email body content associated with the one or more electronic mails. The metadata associated with the one or more electronic mails may comprises, but not limited to, at least one of: sender address, recipient address, subject line, timestamps, and message headers, whereas the email body content, which may contain textual information relevant to identifying claim-related details. The one or more second contents corresponding to the one or more documents attached in the one or more electronic mails may include, but not limited to, attachments in multiple formats including, but not limited to, one of: the PDF file, the Word file, the Excel file, the image file and the like. The one or more documents may comprise claim documents, including at least one of: credit notes, chargebacks, deduction statements, and one or more fields like claim numbers, claim costs, tax amounts, reason codes, and item descriptions.

The data obtaining subsystem 210 interacts with one or more data sources 108, which may include, but not limited to, at least one of: email servers, shared drives, cloud storage systems, and other repositories where the one or more electronic mails and their attachments are stored. The data obtaining subsystem 210 ensures compatibility with a variety of data retrieval protocols, such as, but not limited to, one of: Internet Message Access Protocol (IMAP), Simple Mail Transfer Protocol (SMTP), and Application Programming Interface (API)-based integrations, to dynamically access the one or more electronic mails and the one or more documents from diverse platforms. Additionally, the data obtaining subsystem 210 is configured to manage a large volume of incoming one or more electronic mails and the one or more documents efficiently, ensuring scalability for businesses that deal with thousands of claim-related documents daily.

In another exemplary embodiment, the data obtaining subsystem 210 may incorporate pre-defined configurations or adaptive mechanisms to filter and prioritize the retrieval of data that is most relevant for claim processing. For example, the data obtaining subsystem 210 may identify and download the one or more electronic mails and the one or more documents from specific customer mailboxes or filter the one or more electronic mails based on pre-determined criteria, such as keywords in a subject line or the presence of attachment the one or more documents. Once obtained, the one or more first contents and the one or more second contents are passed to other subsystems for further processing, including pre-processing, classification, and extraction of claim-related information.

In an exemplary embodiment, the plurality of subsystems 110 includes the data pre-processing subsystem 212 that is communicatively connected to the one or more hardware processors 204. The data pre-processing subsystem 212 is configured to pre-process the data to generate pre-processed data associated with at least one of: the one or more first contents and the one or more second contents. The data pre-processing subsystem 212 is configured to extract one or more texts having one or more formats from at least one of: one or more first contents and the one or more second contents, using a document scraper model. The data pre-processing subsystem 212 is further configured to vectorize the extracted one or more texts to extract one or more text chunks from the extracted one or more texts.

The data pre-processing subsystem 212 is configured to ensure that the input data is transformed into a structured and optimized format suitable for further processing by the ML-based system 104. The one or more first contents may include email body content, which may include free-form text, tables, and structured information relevant to claim classification and information extraction. The one or more second contents may include the one or more documents attached in the one or more electronic mails, including at least one of: the PDF files, the Word files, the Excel files, and the image files including claim-related data. The data pre-processing subsystem 212 is configured to extract one or more texts having the one or more formats from the one or more first contents and/or the one or more second contents using the document scraper model. For PDF files, the data pre-processing subsystem 212 is configured to utilize open-source PDF reading libraries to extract text accurately, including from multi-page and tabular documents. For the Word files and the Excel files, text is extracted using file readers capable of parsing content embedded in structured or semi-structured formats. For the image files, text is extracted using machine learning-based Optical Character Recognition (OCR) models, which are trained on diverse datasets to achieve high accuracy in detecting text, even in one of: complex documents and handwritten documents. The extraction process is configured to handle varied file extensions and formats, ensuring compatibility with diverse claim templates. The data pre-processing subsystem 212 effectively retrieves textual data from the email body content and the content of the one or more documents, creating a unified dataset for subsequent operations.

Once the one or more texts are extracted, the data pre-processing subsystem 212 is configured to vectorize the extracted one or more texts to extract one or more text chunks. The extracted one or more texts is converted into one or more numerical representations (embeddings) using pre-trained embedding models, such as OpenAI's Ada embeddings or other state-of-the-art text vectorization techniques. These one or more numerical representations capture the semantic meaning of the one or more texts, enabling the ML-based system 104 to process unstructured content effectively.

The extracted one or more texts is divided into manageable one or more text chunks based on size constraints, such as token length, using Python-based libraries. This ensures efficient usage of downstream machine learning models, particularly large language models (LLMs) that may have token size limitations. The pre-processing of data ensures that only the most relevant and structured information is passed to subsequent subsystems, such as the content classifying subsystem 214. By combining advanced text extraction techniques with robust vectorization and chunking, the data pre-processing subsystem 212 optimizes the input for accuracy, speed, and cost-efficiency.

In an exemplary embodiment, the plurality of subsystems 110 includes the content classifying subsystem 214 that is communicatively connected to the one or more hardware processors 204. As depicted in FIG. 2B, at step 226, the data obtaining subsystem 210 is configured to obtain at least one of: the one or more first contents and the one or more second contents from the one or more data sources 108. At step 228, the data pre-processing subsystem 212 is configured to pre-process the data to generate pre-processed data associated with at least one of: the first contents and the second contents. Further, at step 230, the content classifying subsystem 214 is configured to classify at least one of: a) the one or more first contents as at least one of: one or more claim-based contents and one or more non-claim-based contents, using the ML model with the one or more prompts, and b) the one or more second contents, as at least one of: the one or more claim-based contents and the one or more non-claim-based contents, based on one or more intents of the one or more second contents, using the ML model with the one or more prompts. The content classifying subsystem 214 serves as a core component of the ML-based system 104, enabling automated classification of at least one of: the one or more first contents and the one or more second contents. Further, the content classifying subsystem 214 is configured to determine the claim-based contents, using the ML model and proceed to next process.

The content classifying subsystem 214 is configured to utilizes the ML model with the one or more prompts to analyze the email body and classify at least one of: the one or more first contents and the one or more second contents as the one or more claim-based contents or the one or more non-claim-based contents. The one or more claim-based contents are the one or more electronic mails including information pertinent to claims, such as dispute reasons, credit notes, chargebacks, and deduction-related details. The one or more non-claim-based contents are the one or more electronic mails that do not pertain to claims, such as promotional emails, general inquiries, or irrelevant communications.

The classification is driven by the ML model, such as a Generative Pre-training Transformer (GPT)-based large language model (LLM), enhanced with Retrieval-Augmented Generation (RAG) techniques. The ML model operates using the one or more prompts configured to extract a semantic intent of the email body content. The one or more prompts define classification rules and provide contextual understanding of the email body content.

The one or more second contents correspond to the one or more documents attached in the one or more electronic mails, including at least one of: the PDF files, the Word files, the Excel files, and the image files. The one or more documents are analyzed by the content classifying subsystem 214 to determine the one or more intents of the one or more second contents correspond to the one or more documents attached in the one or more electronic mails. The ML model with the one or more prompts is used to classify the one or more documents as one of: the one or more claim-based contents and one or more non-claim-based contents. The one or more intents of the one or more second contents are analyzed to discern whether the attached one or more documents are relevant to a claim. For instance, the ML-based system identifies the one or more documents with intents related to one of: refunds, chargebacks, and deductions as the one or more claim-based contents. The one or more non-claim-based contents may include at least one of: backup documents, promotional materials, and other irrelevant files.

In an exemplary embodiment, as depicted in flow chart 232 of FIG. 2C, the content classifying subsystem 214 is configured to classify at least one of: the one or more first contents and the one or more second contents as at least one of: the one or more claim-based contents and the one or more non-claim-based contents. At step 234, the content classifying subsystem 214 is configured to obtain the one or more text chunks related to at least one of: the one or more first contents and the one or more second contents. The one or more text chunks are created by the data pre-processing subsystem 212, which extracts and segments the text into manageable portions based on one of: token size and length constraints, ensuring efficient processing by the ML model. The one or more text chunks preserve the semantic meaning of the original text while optimizing the use of the ML model's capabilities.

At step 236, the content classifying subsystem 214 selects the one or more prompts from a database by comparing the one or more text chunks with one or more training datasets stored in the database using a similarity matching technique. The similarity matching technique involves comparing the content of the one or more text chunks to training data stored in the database, ensuring that the most relevant prompts are applied to guide the ML model in understanding the semantic context of the one or more text chunks. The one or more prompts related to the one or more text chunks are selected by comparing the one or more text chunks related to at least one of: the one or more first contents and the one or more second contents, with training data stored in the database. The one or more prompts are predefined instructions or rules that guide the ML model in analysing the one or more text chunks. The content classifying subsystem 214 uses the one or more numerical representations-based comparison method to measure the semantic similarity between the text chunks and the training datasets. For instance, one or more numerical representations are numerical vector representations of text, and similarity is determined by calculating the distance (e.g., cosine similarity) between embeddings of the one or more text chunks and those of the labelled examples in the training datasets.

At step 238, the content classifying subsystem 214 is configured to determine the one or more claim-based contents and the one or more non-claim-based contents from the at least one of: the one or more first contents and the one or more second contents, based on the one or more prompts selected from the database, using the ML model. The selected one or more prompts provide the ML model with contextual instructions for identifying whether a text chunk of the one or more text chunks pertains to the one or more claim-based contents. For example, a prompt might guide the ML model to detect terms like "deduction reason," "invoice number," or "credit issued," which are indicative of the one or more claim-based content. Conversely, absence of such terms or presence of unrelated information (e.g., "promotional offer," "service updates") may result in classification as the one or more non-claim-based content. The ML model, such as the GPT-based large language model (LLM), processes the one or more text chunks in conjunction with the selected one or more prompts to identify the classification.

At step 240, the content classifying subsystem 214 is configured to classify at least one of: the one or more first contents and the one or more second contents as at least one of: the one or more claim-based contents and the one or more non-claim-based contents. The one or more claim-based contents and the one or more non-claim-based contents are stored in the system for downstream processing. The classification results are structured into a standardized format, such as JavaScript Object Notation (JSON), and passed to downstream systems or stored in the one or more data sources 108 for further processing, such as validation against financial records or reconciliation in enterprise resource planning (ERP) systems.

In an exemplary embodiment, the plurality of subsystems 110 includes the entity identifying subsystem 216 that is communicatively connected to the one or more hardware processors 204. The entity identifying subsystem 216 is configured to identify the one or more entities corresponding to at least one of: the one or more first contents and the one or more second contents, for extracting the one or more claim-based contents. The entity identifying subsystem 216 maps one or more electronic mail domains of the one or more entities with one or more pre-determined information associated with the one or more electronic mail domains of the one or more entities stored in one or more data sources. As depicted in FIG. 2D, at step 242, the entity identifying subsystem 216 is configured to map one or more electronic mail domains of the one or more electronic mails with one or more pre-determined information associated with the one or more electronic mail (email) domains of the one or more entities stored in the one or more data sources 108. The entity identifying subsystem 216 is configured to analyze the sender email address from the metadata of the one or more first contents. The entity identifying subsystem 216 is further configured to extract the domain portion of the email address (e.g., "example.com" from "user@example.com"). This email domain is then matched against the database of pre-determined information stored in the one or more data sources 108, which may include mappings of email domains to specific buyer businesses. For example, "example.com" might correspond to "ABC Corporation." This process enables automatic identification of the one or more entities (e.g., buyer business) associated with the incoming claim, ensuring that the extracted claim details may be accurately attributed to the correct entity within the one or more entities for downstream processing.

At step 244, the entity identifying subsystem 216 is further configured to extract the one or more entities from at least one of: one or more headers, one or more logos, and one or more signatures, related to the one or more entities in at least one of: the one or more first contents and the one or more second contents. The entity identifying subsystem 216 is configured to analyze document headers in the one or more second contents (e.g., "Claim issued by: ABC Corporation") to identify entity names explicitly mentioned. The entity identifying subsystem 216 uses image recognition or OCR techniques to identify logos embedded in the one or more second contents. For example, a logo image may correspond to a specific buyer business, and the entity identifying subsystem 216 of the ML-based system 104 is configured to match the detected logo against a pre-stored database of logo-to-entity mappings. The entity identifying subsystem 216 is further configured to extract buyer business information from the one or more document footers or electronic signatures, which often include, at least one of, but not limited to, entity names, addresses, and contact information. Finally, at step 246, the entity identifying subsystem 216 is configured to identify the one or more entities corresponding to at least one of: the one or more first contents and the one or more second contents.

In an exemplary embodiment, the plurality of subsystems 110 includes the output subsystem 218 that is communicatively connected to the one or more hardware processors 204. The output subsystem 218 is configured to provide at least one of: the one or more claim-based contents, and the one or more non-claim-based contents, as the output, to the one or more users on the one or more user interfaces associated with the one or more electronic devices 102 associated with the one or more users. The output subsystem 218 serves as the final stage of the ML-based system 104, ensuring that processed and classified data is made available to the one or more users in a user-friendly and accessible manner.

The output subsystem 218 is configured to deliver outputs comprising at least one of: claim identifiers, monetary details, deduction details, dates, itemized descriptions, and the like. The one or more non-claim-based contents, which may include email metadata or classified non-relevant attachments identified during processing. The outputs are presented to the one or more users via the one or more user interfaces on the one or more electronic devices 102, including at least one of: laptops, desktops, smartphones, tablets, and the like. The output subsystem 218 supports exporting the one or more claim-based contents into one or more formats compatible with downstream systems, including at least one of: the excel files for manual review, structured JSON, Extensible Markup Language (XML) files, and the like for integration with at least one of: the ERP systems, financial reconciliation tools, and other third-party software. The output subsystem 218 enables role-based access, ensuring that different one or more users (e.g., financial analysts, accounts receivable teams, or business executives) receive outputs tailored to their specific requirements.

In an exemplary embodiment, the plurality of subsystems 110 includes the training subsystem 220 that is communicatively connected to the one or more hardware processors 204. The training subsystem 220 is configured to train the ML model. For training the ML mode, the training subsystem 220 is configured to obtain one or more training datasets comprising at least one of: the one or more first contents corresponding to the one or more electronic mails and the one or more second contents corresponding to the one or more documents attached in the one or more electronic mails. The one or more first contents include email body text containing unstructured or semi-structured information, including at least one of: sender details, subject lines, textual content describing claim-related details, and the like. The one or more second contents include attachments including at least one of: PDF, Word, Excel, or image files that may contain claim-specific information, including fields including at least one of: Claim Number, Claim Date, Tax Amount, and Reason Codes. The training subsystem 220 is configured to collect these the one or more training datasets from one or more data sources 108, including historical claim records, labelled datasets for supervised learning, or manually curated datasets annotated by domain experts.

The training subsystem 220 is configured to train the ML model on the one or more training datasets using one or more hyperparameters. The one or more hyperparameters include parameters such as, but not limited to, at least one of: learning rate, batch size, and number of epochs, which are optimized to ensure the ML model converges effectively during training. The training process involves using labelled datasets where the one or more first contents and the one or more second contents are pre-classified as either one or more claim-based contents or one or more non-claim-based contents. The ML model learns to identify key features in the datasets, such as keywords, phrases, or patterns that indicate whether the content pertains to a claim. For example, the ML model may recognize terms like "credit note," "charge-back," or "deduction" in the email body or the one or more documents. The training subsystem 220 may leverage advanced models such as transformer-based architectures (e.g., GPT, Bidirectional Encoder Representations from Transformers (BERT)) fine-tuned on domain-specific claim data to enhance accuracy.

After training, the ML model is utilized to classify at least one of: the one or more first contents and the one or more second contents, as at least one of: the one or more claim-based contents and the one or more non-claim-based contents. The ML model employs embeddings to represent text content as numerical vectors, capturing semantic meaning. A similarity search compares these vectors with pre-stored embeddings of labeled claim and non-claim data to determine classification. For example, if a training dataset includes labeled embeddings for claim-related content such as "Invoice No. 12345" or "short payment details," the ML model matches new inputs against these embeddings to classify them appropriately. This classification step ensures that both the one or more electronic mails and the one or more documents are accurately categorized, allowing only claim-based contents to proceed for further processing.

In an exemplary embodiment, the plurality of subsystems 110 includes the accuracy assessment subsystem 222 that is communicatively connected to the one or more hardware processors 204. The accuracy assessment subsystem 222 is configured to continuously monitor the performance of the ML model over a pre-defined time duration. In an embodiment, performance metrics are collected during both training and live operation phases. The performance metrics may include at least one of: accuracy, precision, recall, and classification error rates, specifically for classifying at least one of: the one or more first contents and the one or more second contents. The accuracy assessment subsystem 222 is further configured to analyze the classification results to evaluate how well the ML model is distinguishing between the one or more claim-based contents and the one or more non-claim-based contents. In an embodiment, monitoring is conducted over a configurable time window, which allows the accuracy assessment subsystem 222 to track trends in the ML model performance, such as gradual degradation or performance inconsistencies across different data types or formats.

The accuracy assessment subsystem 222 is configured to determine whether the performance of the ML model on the classification of at least one of: the one or more first contents and the one or more second contents, is below a threshold value. The threshold value is predefined and may represent the minimum acceptable performance level required for reliable classification. For example, a threshold accuracy value of 95% may be set for production-grade claim classification. When the performance metrics fall below this threshold value, the accuracy assessment subsystem 222 identifies specific issues, including misclassification of the one or more claim-based contents and the one or more non-claim-based contents, deprived handling of new documents, or difficulty in processing uncommon terminology. The determination process involves comparing the actual performance metrics against the threshold and generating alerts or reports to flag underperformance.

The accuracy assessment subsystem 222 is configured to fine-tune the ML model with a plurality of parameters to optimize the ML model for classifying at least one of: the one or more first contents and the one or more second contents, as at least one of: the one or more claim-based contents and the one or more non-claim-based contents. The accuracy assessment subsystem 222 is configured to adjust the one or more hyperparameters including at least one of: learning rate, number of training epochs, and regularization settings to improve the ML model's performance. The accuracy assessment subsystem 222 is configured to utilize the one or more feedback from classification errors or user-provided corrections to identify weaknesses in the ML model. For example, if specific claim types or document are frequently misclassified, the accuracy assessment subsystem 222 incorporates additional training data or prompts specific to these cases. Fine-tuning may involve re-training the ML model using updated datasets that include newly labeled examples or edge cases observed during live operation. The accuracy assessment subsystem 222 may adaptively optimize the ML model's parameters without requiring a complete retraining process, reducing downtime, and ensuring faster improvements.

In an exemplary embodiment, the plurality of subsystems 110 includes the re-training subsystem 224 that is communicatively connected to the one or more hardware processors 204. The re-training subsystem 224 is configured to re-train the ML model by obtaining one or more assessments of the one of more training datasets, from the one or more users. The one or more assessments may involve user-provided one or more feedback regarding the accuracy of the ML model's classifications for both the one or more first contents and the one or more second contents. For example, a user may assess whether the claim numbers, amounts, or deduction reasons extracted from a document match the expected results or if the ML model incorrectly classified a non-claim email as a claim-based content.

The re-training subsystem 224 is configured to identify differences between the ML model classification and the one or more assessments obtained from the one or more users, to determine whether the ML model needs to be optimized on the classification. This process involves comparing the ML model's predictions with the user-provided corrections to detect patterns of errors or inconsistencies. For example, the re-training subsystem 224 may identify recurring errors, such as failure to recognize specific terminology in claim documents or misclassification of attachments that contain supplemental data as claim-based contents. The re-training subsystem 224 analyses these differences to determine areas of improvement for the ML model, including underperformance in recognizing new templates, terminology, or document layouts. Based on this analysis, the re-training subsystem 224 determines whether the ML model requires optimization to address the identified gaps.

The re-training subsystem 224 is configured to re-train the ML model by at least one of: updating the pre-processed data and adjusting the one or more hyperparameters, based on one or more feedback received from the one or more users on the classification. The re-training subsystem 224 incorporates new or updated training datasets that reflect the feedback provided by the one or more users. For example: Adding corrected examples of the one or more claim-based contents or the one or more non-claim-based contents to the training dataset. Including new document templates, terminology, or variations in email content observed in live operations. The re-training subsystem 224 fine-tunes hyper-parameters such as learning rate, batch size, or regularization coefficients to improve the ML model's ability to generalize and reduce classification errors. The re-training process involves re-running the ML model training pipeline with the updated data and optimized the one or more hyperparameters to improve its performance on classification tasks.

Figure 3A:
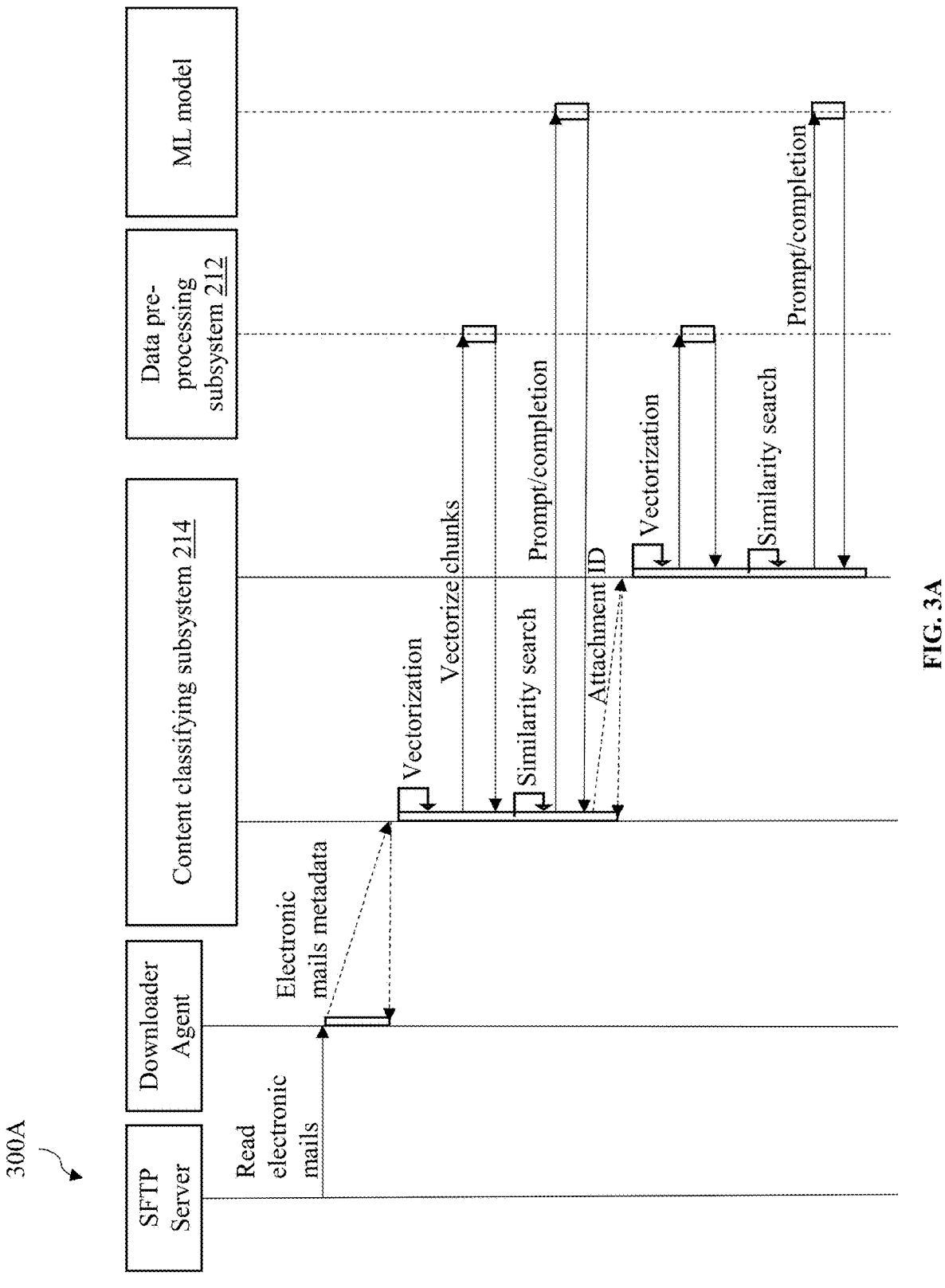
FIGS. 3A and 3B are detailed architectural views of a Generative artificial intelligence (AI) (Gen AI) claim parser, in accordance with an embodiment of the present disclosure.
Figure 3B:
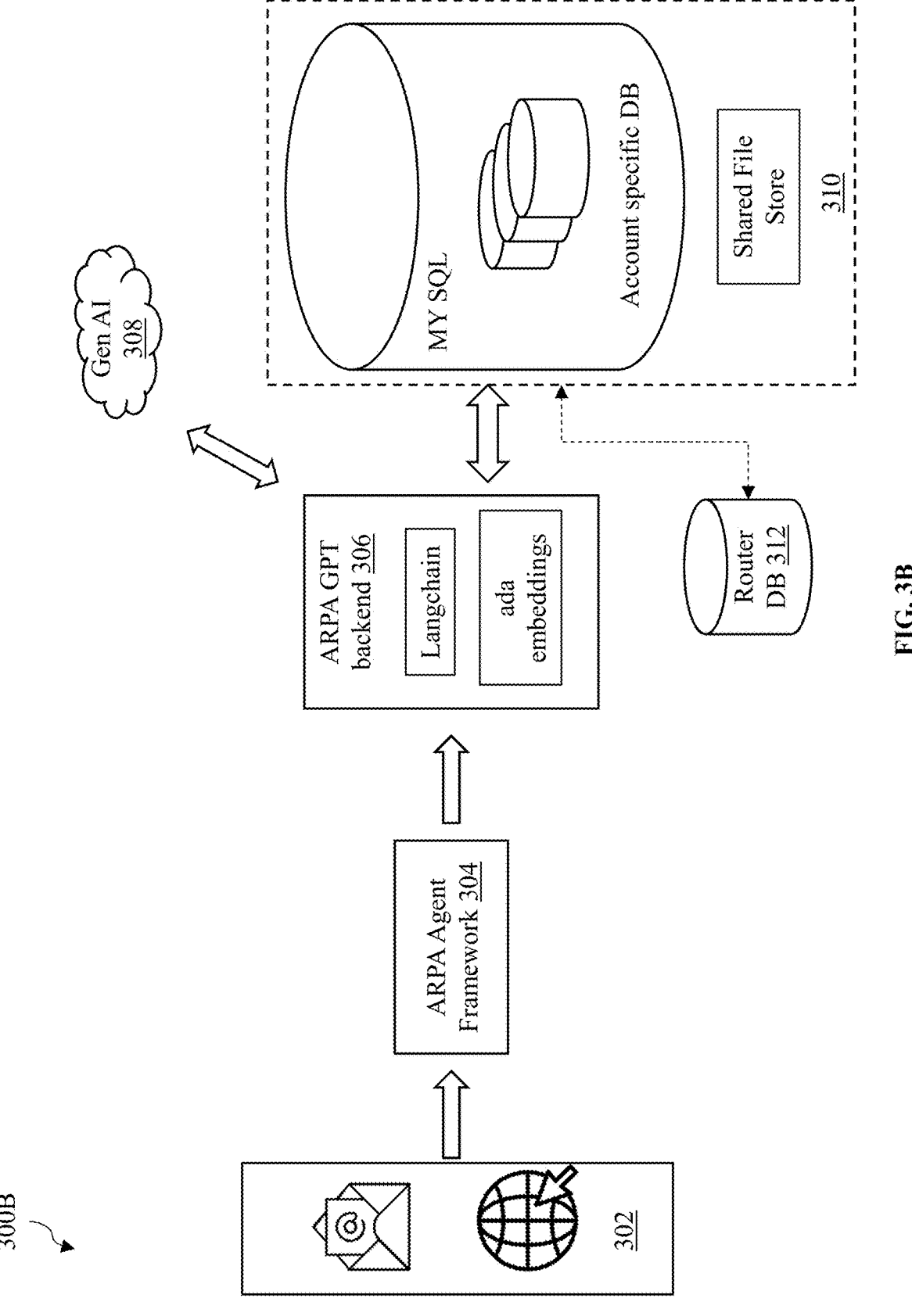

FIGS. 3A and 3B is a detailed architectural view of a Generative artificial intelligence (AI) (Gen AI) claim parser (300A and 300B), in accordance with an embodiment of the present disclosure.

In an exemplary embodiment, FIG. 3A represents the workflow and interaction among the plurality of subsystems 110 involved in the parsing process. The Secure File Transfer Protocol (SFTP) server is configured as a source for the data of the one or more electronic mails. The SFTP server is configured to pre-process and transfer the one or more electronic mails and associated metadata for processing. The downloader agent is configured to fetch the data associated with at least one of: the one or more first contents corresponding to the one or more electronic mails and the one or more second contents corresponding to the one or more documents attached in the one or more electronic mails from the SFTP server.

The content classifying subsystem 214 is configured to classify the one or more first contents as at least one of: the one or more claim-based contents and the one or more non-claim-based contents, using the ML model with the one or more prompts. The content classifying subsystem 214 is configured to classify the one or more second contents, as at least one of: the one or more claim-based contents and the one or more non-claim-based contents, based on the one or more intents of the one or more second contents, using the ML model with the one or more prompts. The content classifying subsystem 214 is configured to convert the one or more first contents and the one or more second contents into vectorized formats for computational analysis. The content classifying subsystem 214 utilizes an artificial intelligence (AI) based Similarity Search (AISS) library for similarity search to cluster or identify similar content. The AI based similarity search may include at least one of: image based similarity search, text based similarity search, video and audio based similarity search, and the like. The AI based similarity search are particularly designed for searching through dense vectors and can handle millions of high-dimensional vectors quickly. Some well-known AI based similarity searching techniques and frameworks include Facebook AI Similarity Search (Faiss), Annoy and HNSW (Hierarchical Navigable Small World). These techniques are commonly utilized in applications like recommendation systems, image and video retrieval, and natural language processing to enhance user experience by providing relevant results based on user queries or preferences.

The content classifying subsystem 214 is configured to process the vectorized one or more text chunks from the content classifier. The content classifying subsystem 214 uses the one or more prompts and completions (likely powered by a Gen AI model) to extract the one or more claim-based contents. Further, the content classifying subsystem 214 processes the one or more documents with further vectorization and AISS searches.

In an exemplary embodiment, FIG. 3B illustrates the high-level architecture integrating the Gen AI claim parser system. At 302, the data obtaining subsystem 210 is configured to obtain data associated with at least one of: one or more first contents corresponding to the one or more electronic mails and the one or more second contents corresponding to the one or more documents attached in the one or more electronic mails, from the one or more data sources 108. At step 304, Advanced Robotic Process Automation (ARPA) Agent Framework orchestrates tasks and facilitates seamless interactions with backend components. At step 306, the core of the ML-based system is the ARPA GPT Backend, which utilizes a Langchain for task-specific orchestration and Ada embeddings for vectorization and similarity search. This backend communicates with the Gen AI module at step 308, providing generative artificial intelligence (AI) capabilities essential for parsing and generating the one or more claim-based contents.

The ML-based system 104 integrates robust database components to ensure data management and scalability at step 310. A My Structured Query Language (MySQL) database is employed to store account-specific data, maintaining data isolation and security. Additionally, a Shared File Store is utilized to manage access to shared resources such as large datasets or documents. Complementing these components, a Router Database 312 is likely included to maintain routing information or indexes, optimizing data retrieval and overall system efficiency. This integrated architecture exemplifies a scalable and efficient approach to automating parsing and processing the one or more documents.

FIG. 4 is a flow chart illustrating a ML-based method 400 for automatically processing the one or more documents, in accordance with an embodiment of the present disclosure.

At step 402, the data associated with at least one of: one or more first contents corresponding to one or more electronic mails and one or more second contents corresponding to one or more documents attached in the one or more electronic mails, is obtained from the one or more data sources 108.

At step 404, the data is pre-processed to generate pre-processed data associated with at least one of: the one or more first contents and the one or more second contents. The pre-processing of the data comprises extracting the one or more texts from the one or more formats of at least one of: the one or more first contents and the one or more second contents, using the document scraper model. The pre-processing of the data comprises vectorizing the extracted one or more texts to extract the one or more text chunks from the extracted one or more texts.

At step 406, the one or more first contents are classified as at least one of: the one or more claim-based contents and the one or more non-claim-based contents, using the ML model with the one or more prompts. Further, the one or more second contents, are classified as at least one of: the one or more claim-based contents and the one or more non-claim-based contents, based on one or more intents of the one or more second contents, using the ML model with the one or more prompts.

At step 408, at least one of: the one or more claim-based contents and the one or more non-claim-based contents are provided as the output, to the one or more users on the one or more user interfaces associated with the one or more electronic devices 102 associated with the one or more users.

At Step 410, the ML model is re-trained by at least one of: updating the pre-processed data and adjusting the one or more hyperparameters, based on the one or more feedback received from the one or more users on the classification.

Numerous advantages of the present disclosure may be apparent from the discussion above. In accordance with the present disclosure, the ML-based system 104 for claim processing offers a robust, scalable, and automated solution for managing the complexities of B2B claim management. By leveraging advanced ML models, the ML-based system 104 eliminates the need for template-specific bots and manual intervention, addressing the inherent challenges of diverse claim formats, non-standardized terminologies, and unstructured data in the one or more electronic mails and the one or more documents attached in the one or more electronic mails.

The disclosed ML-based system 104 provides end-to-end automation, including classification of the one or more electronic mails into the one or more claim-based contents and the one or more non-claim-based contents, identification of relevant claim attachments, extraction of critical claim details such as claim numbers, dates, amounts, deduction reasons, and mapping these details to the corresponding buyer businesses. The format-agnostic approach ensures compatibility with a wide range of document types, including PDFs, Word files, Excel sheets, and image files, while the use of dynamic prompts and similarity-based techniques enhances accuracy in information extraction. By incorporating user feedback into the training and re-training processes, the ML-based system 104 remains flexible to evolving business needs and document variations.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the ML-based system 104 either directly or through intervening I/O controllers. Network adapters may also be coupled to the ML-based system 104 to enable the data processing system to become coupled to other data processing systems or remote printers or storage devices through intervening private or public networks. Modems, cable modems and Ethernet cards are just a few of the currently available types of network adapters.

A representative hardware environment for practicing the embodiments may include a hardware configuration of an information handling/ML-based system 104 in accordance with the embodiments herein. The ML-based system 104 herein comprises at least one processor or central processing unit (CPU). The CPUs are interconnected via the system bus to various devices including at least one of: a random-access memory (RAM), read-only memory (ROM), and an input/output (I/O) adapter. The I/O adapter can connect to peripheral devices, including at least one of: disk units and tape drives, or other program storage devices that are readable by the ML-based system 104. The ML-based system 104 can read the inventive instructions on the program storage devices and follow these instructions to execute the methodology of the embodiments herein.

The ML-based system 104 further includes a user interface adapter that connects a keyboard, mouse, speaker, microphone, and/or other user interface device including a touch screen device (not shown) to the bus to gather user input. Additionally, a communication adapter connects the bus to a data processing network, and a display adapter connects the bus to a display device which may be embodied as an output device including at least one of: a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. A machine-learning based (ML-based) method for automatically processing one or more documents, the ML-based method comprising:

obtaining, by one or more hardware processors, data associated with at least one of: one or more first contents corresponding to one or more electronic mails and one or more second contents corresponding to the one or more documents attached in the one or more electronic mails, from one or more data sources;

pre-processing, by the one or more hardware processors, the data to generate pre-processed data associated with at least one of: the one or more first contents and the one or more second contents;

classifying, by the one or more hardware processors, at least one of:

the one or more first contents as at least one of: one or more claim-based contents and one or more non-claim-based contents, using a machine learning (ML) model with one or more prompts; and the one or more second contents, as at least one of: the one or more claim-based contents and the one or more non-claim-based contents, based on one or more intents of the one or more second contents, using the ML model with the one or more prompts;

providing, by the one or more hardware processors, at least one of: the one or more claim-based contents and the one or more non-claim-based contents, as an output, to one or more users on one or more user interfaces associated with one or more electronic devices associated with the one or more users;

monitoring, by the one or more hardware processors, performance of the ML model for a time duration;

determining, by the one or more hardware processors, whether the performance of the ML model on the classification of at least one of: the one or more first contents and the one or more second contents, is below a threshold value; and fine-tuning, by the one or more hardware processors, the ML model with a plurality of parameters to optimize the ML model for classifying at least one of: the one or more first contents and the one or more second contents, as at least one of: the one or more claim-based contents and the one or more non-claim-based contents.

2. The ML-based method of claim 1, wherein pre-processing the data comprises:

extracting, by the one or more hardware processors, one or more texts having one or more formats from at least one of: one or more first contents and the one or more second contents, using a document scraper model; and vectorizing, by the one or more hardware processors, the extracted one or more texts to extract one or more text chunks from the extracted one or more texts.

3. The ML-based method of claim 2, wherein classifying at least one of: the one or more first contents and the one or more second contents as at least one of: the one or more claim-based contents and the one or more non-claim-based contents, comprises:

obtaining, by the one or more hardware processors, the one or more text chunks, related to at least one of: the one or more first contents and the one or more second contents;

selecting, by the one or more hardware processors, the one or more prompts from a database by comparing the one or more text chunks with one or more training datasets stored in the database using a similarity matching technique;

determining, by the one or more hardware processors at least one of: the one or more claim-based contents and the one or more non-claim-based contents from the at least one of: the one or more first contents and the one or more second contents, based on the one or more prompts selected from the database, using the ML model; and classifying, by the one or more hardware processors, at least one of: the one or more first contents and the one or more second contents as at least one of: the one or more claim-based contents and the one or more non-claim-based contents.

4. The ML-based method of claim 1, further comprising identifying, by the one or more hardware processors, one or more entities corresponding to at least one of: the one or more first contents and the one or more second contents, for extracting the one or more claim-based contents, by at least one of:

mapping, by the one or more hardware processors, one or more electronic mail domains of the one or more electronic mails with one or more pre-determined information associated with the one or more electronic mail domains of the one or more entities stored in the one or more data sources, to identify the one or more entities; and extracting, by the one or more hardware processors, the one or more entities from at least one of: one or more headers, one or more logos, and one or more signatures, in at least one of: the one or more first contents and the one or more second contents.

5. The ML-based method of claim 1, further comprising training, by the one or more hardware processors, the ML model, by:

obtaining, by the one or more hardware processors, one or more training datasets comprising information associated with at least one of: the one or more first contents corresponding to the one or more electronic mails and the one or more second contents corresponding to the one or more documents attached in the one or more electronic mails;

training, by the one or more hardware processors, the ML model on the one or more training datasets using one or more hyperparameters; and classifying, by the one or more hardware processors, at least one of: the one or more first contents and the one or more second contents, as at least one of: the one or more claim-based contents and the one or more non-claim-based contents, based on the trained ML model.

6. The ML-based method of claim 5, further comprising re-training, by the one or more hardware processors, the ML model by:

obtaining, by the one or more hardware processors, one or more assessments of the one of more training datasets, from the one or more users;

identifying, by the one or more hardware processors, differences between the ML model classification and the one or more assessments obtained from the one or more users, to determine whether the ML model need to be optimized on the classification; and re-training, by the one or more hardware processors, the ML model by at least one of: updating the pre-processed data and adjusting the one or more hyperparameters, based on one or more feedback received from the one or more users on the classification.

7. A machine learning based (ML-based) system for automatically processing one or more documents, the ML-based system comprising:

one or more hardware processors;

a memory coupled to the one or more hardware processors, wherein the memory comprises a plurality of subsystems in form of programmable instructions executable by the one or more hardware processors, and wherein the plurality of subsystems comprises:

a data obtaining subsystem configured to obtain data associated with at least one of: one or more first contents corresponding to one or more electronic mails and one or more second contents corresponding to the one or more documents attached in the one or more electronic mails, from one or more data sources;

a data pre-processing subsystem configured to pre-process the data to generate pre-processed data associated with at least one of: the one or more first contents and the one or more second contents;

a content classifying subsystem configured to classify at least one of:

the one or more first contents as at least one of: one or more claim-based contents and one or more non-claim-based contents, using a machine learning (ML) model with one or more prompts; and the one or more second contents, as at least one of: the one or more claim-based contents and the one or more non-claim-based contents, based on one or more intents of the one or more second contents, using the ML model with the one or more prompts;

an output subsystem configured to provide at least one of: the one or more claim-based contents and the one or more non-claim-based contents, as an output, to one or more users on one or more user interfaces associated with one or more electronic devices associated with the one or more users; and an accuracy assessment subsystem configured to:

monitor performance of the ML model for a time duration;

determine whether the performance of the ML model on the classification of at least one of: the one or more first contents and the one or more second contents, is below a threshold value; and fine-tune the ML model with a plurality of parameters to optimize the ML model for classifying at least one of: the one or more first contents and the one or more second contents, as at least one of: the one or more claim-based contents and the one or more non-claim-based contents.

8. The ML-based system of claim 7, wherein in pre-processing the data, the data pre-processing subsystem is configured to:

extract one or more texts having one or more formats from at least one of: one or more first contents and the one or more second contents, using a document scraper model; and vectorizing the extracted one or more texts to extract one or more text chunks from the extracted one or more texts.

9. The ML-based system of claim 8, wherein in classifying at least one of: the one or more first contents and the one or more second contents as at least one of: the one or more claim-based contents and the one or more non-claim-based contents, the content classifying subsystem is configured to:

obtain the one or more text chunks, related to at least one of: the one or more first contents and the one or more second contents;

select the one or more prompts from a database by comparing the one or more text chunks with one or more training datasets stored in the database, using a similarity matching technique;

determine the one or more claim-based contents and the one or more non-claim-based contents from the at least one of: the one or more first contents and the one or more second contents, based on the one or more prompts selected from the database, using the ML model; and classify at least one of: the one or more first contents and the one or more second contents as at least one of: the one or more claim-based contents and the one or more non-claim-based contents.

10. The ML-based system of claim 7, further comprising an entity identifying subsystem configured to identify one or more entities corresponding to at least one of: the one or more first contents and the one or more second contents, for extracting the one or more claim-based contents, by at least one of:

mapping one or more electronic mail domains of the one or more electronic mails with one or more pre-determined information associated with the one or more electronic mail domains of the one or more entities stored in the one or more data sources, to identify the one or more entities; and extracting the one or more entities from at least one of: one or more headers, one or more logos, and one or more signatures, in at least one of: the one or more first contents and the one or more second contents.

11. The ML-based system of claim 7, further comprising a training subsystem configured to train the ML model by:

obtaining one or more training datasets comprising information associated with at least one of: the one or more first contents corresponding to the one or more electronic mails and the one or more second contents corresponding to the one or more documents attached in the one or more electronic mails;

training the ML model on the one or more training datasets using one or more hyperparameters; and classifying at least one of: the one or more first contents and the one or more second contents, as at least one of: the one or more claim-based contents and the one or more non-claim-based contents, based on the trained ML model.

12. The ML-based system of claim 11, further comprising a re-training subsystem configured to re-train the ML model by:

obtaining one or more assessments of the one of more training datasets, from the one or more users;

identifying differences between the ML model classification and the one or more assessments obtained from the one or more users, to determine whether the ML model need to be optimized on the classification; and re-training the ML model by at least one of: updating the pre-processed data and adjusting the one or more hyperparameters, based on one or more feedback received from the one or more users on the classification.

13. A non-transitory computer-readable storage medium having instructions stored therein that when executed by one or more hardware processors, cause the one or more hardware processors to execute operations of:

> obtaining data associated with at least one of: one or more first contents corresponding to one or more electronic mails and one or more second contents corresponding to the one or more documents attached in the one or more electronic mails, from one or more data sources;
>
> pre-processing the data to generate pre-processed data associated with at least one of: the one or more first contents and the one or more second contents;
>
> classifying at least one of:
>
>> the one or more first contents as at least one of: one or more claim-based contents and one or more non-claim-based contents, using a machine learning (ML) model with one or more prompts; and
>>
>> the one or more second contents, as at least one of: the one or more claim-based contents and the one or more non-claim-based contents, based on one or more intents of the one or more second contents, using the ML model with the one or more prompts;
>
> providing at least one of: the one or more claim-based contents and the one or more non-claim-based contents, as an output, to one or more users on one or more user interfaces associated with one or more electronic devices associated with the one or more users;
>
> monitoring performance of the ML model for a time duration;
>
> determining whether the performance of the ML model on the classification of at least one of: the one or more first contents and the one or more second contents, is below a threshold value; and
>
> fine-tuning the ML model with a plurality of parameters to optimize the ML model for classifying at least one of: the one or more first contents and the one or more second contents, as at least one of: the one or more claim-based contents and the one or more non-claim-based contents.

14. The non-transitory computer-readable storage medium of claim 13, wherein pre-processing the data comprises:

> extracting one or more texts having one or more formats from at least one of: one or more first contents and the one or more second contents, using a document scraper model; and
>
> vectorizing the extracted one or more texts to extract one or more text chunks from the extracted one or more texts.

15. The non-transitory computer-readable storage medium of claim 14, wherein classifying at least one of: the one or more first contents and the one or more second contents as at least one of: the one or more claim-based contents and the one or more non-claim-based contents, comprises:

> obtaining the one or more text chunks, related to at least one of: the one or more first contents and the one or more second contents;
>
> selecting the one or more prompts from a database by comparing the one or more text chunks with one or more training datasets stored in the database, using a similarity matching technique;

> determining at least one of: the one or more claim-based contents and the one or more non-claim-based contents from the at least one of: the one or more first contents and the one or more second contents, based on the one or more prompts selected from the database, using the ML model; and
>
> classifying at least one of: the one or more first contents and the one or more second contents as at least one of: the one or more claim-based contents and the one or more non-claim-based contents.

16. The non-transitory computer-readable storage medium of claim 13, further comprising identifying one or more entities corresponding to at least one of: the one or more first contents and the one or more second contents, for extracting the one or more claim-based contents, by at least one of:

> mapping one or more electronic mail domains of the one or more electronic mails with one or more pre-determined information associated with the one or more electronic mail domains of the one or more entities stored in the one or more data sources, to identify the one or more entities; and
>
> extracting the one or more entities from at least one of: one or more headers, one or more logos, and one or more signatures, in at least one of: the one or more first contents and the one or more second contents.

17. The non-transitory computer-readable storage medium of claim 13, further comprising training the ML model, by:

> obtaining one or more training datasets comprising information associated with at least one of: the one or more first contents corresponding to the one or more electronic mails and the one or more second contents corresponding to the one or more documents attached in the one or more electronic mails;
>
> training the ML model on the one or more training datasets using one or more hyperparameters; and
>
> classifying at least one of: the one or more first contents and the one or more second contents, as at least one of: the one or more claim-based contents and the one or more non-claim-based contents, based on the trained ML model.

18. The non-transitory computer-readable storage medium of claim 17, further comprising re-training the ML model by:

> obtaining one or more assessments of the one of more training datasets, from the one or more users;
>
> identifying differences between the ML model classification and the one or more assessments obtained from the one or more users, to determine whether the ML model need to be optimized on the classification; and
>
> re-training the ML model by at least one of: updating the pre-processed data and adjusting the one or more hyperparameters, based on one or more feedback received from the one or more users on the classification.

* * * * *